Patented Aug. 9, 1932

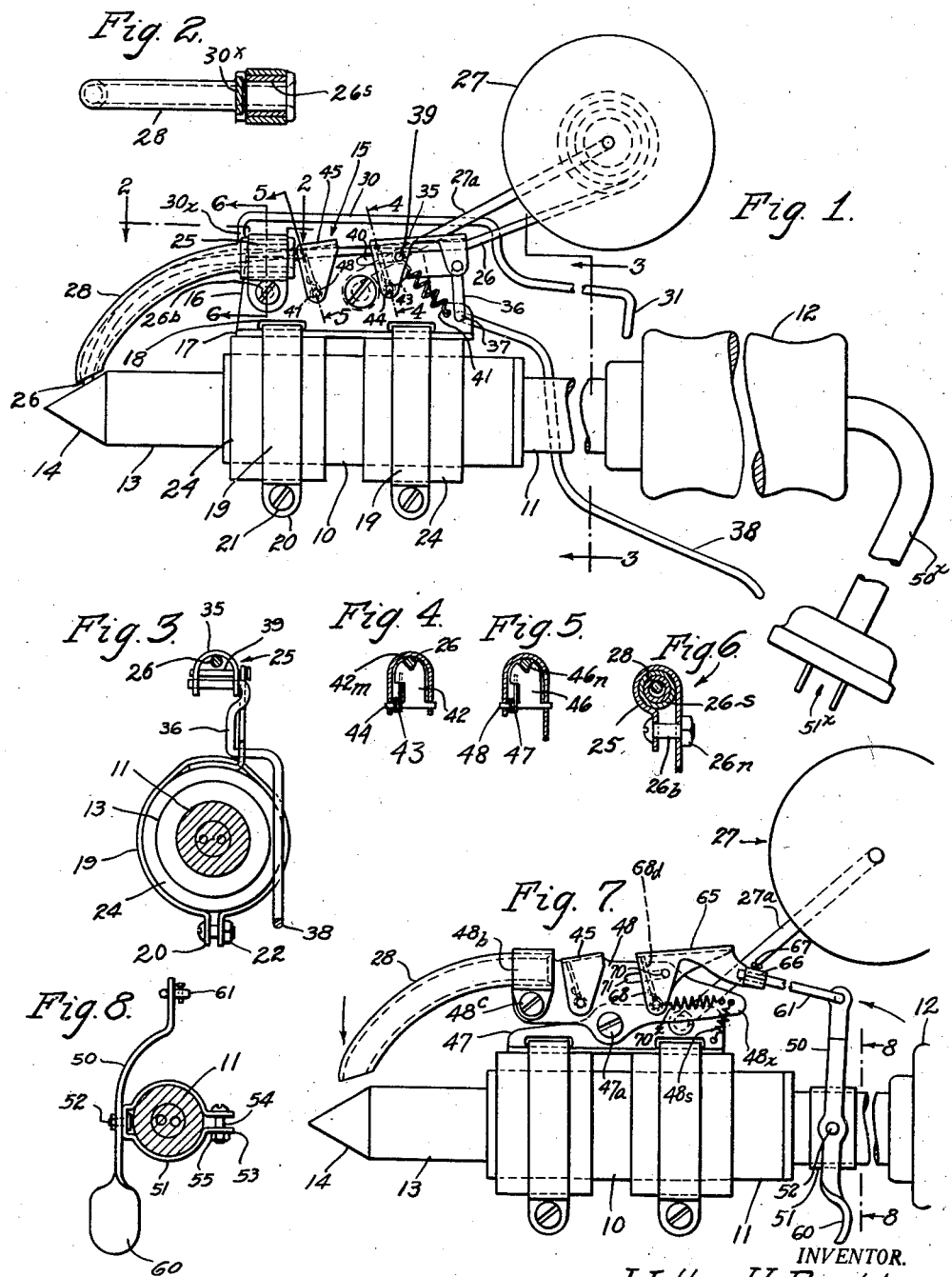

1,871,009

UNITED STATES PATENT OFFICE

WALTER H. RIGHTER, OF GLENDALE, CALIFORNIA

WELDING AND SOLDERING APPLIANCE

Application filed October 15, 1930. Serial No. 488,786.

This invention relates to means for feeding welding material to a welding appliance or feeding solder to a soldering tool.

The invention may be embodied in a variety of forms and is illustrated by way of example as being applied to a soldering tool and as being designed to feed solder in a wire form to said tool at the point of use.

An object of the invention is to provide an attachment for the purpose stated which may be conveniently attached to soldering devices or welding tools already on the market and which will be provided with suitable manually operable means for conveniently feeding the solder or welding material to the point of use, as required, during the operation of the tool.

Another object of the invention is to provide improved means for adjusting the delivery portion of the solder feed device whether in a position wherein it is located close to the soldering portion of the tool; or in a position where it is farther removed from the soldering portion of the tool so that the tool may be heated without melting the solder at a time when not required for use.

Other objects, advantages and features of invention may hereinafter appear.

Referring to the accompanying drawing which illustrates what is at present deemed to be a preferred embodiment of the invention, Fig. 1 is a side elevation of a soldering tool showing the invention attached thereto, portions of the attachment and tool being broken away in order to contract the length of the view.

Fig. 2 is a transverse section on irregular line 2—2 of Fig. 1, showing only certain details of the feeding mechanism.

Fig. 3 is a cross section on line 3—3 of Fig. 1, parts being omitted.

Figs. 4, 5 and 6 are partial cross sections taken respectively on lines 4—4, 5—5 and 6—6 of Fig. 1.

Fig. 7 is a side elevation showing a modified form of the invention attached to a soldering tool.

Fig. 8 is a cross section taken on line 8—8 of Fig. 7 showing only the feed lever and parts adjacent thereto.

Referring in detail to the drawing, wherein my newly invented attachment is shown mounted upon a well known type of electrically heated soldering tool, the cylindrical body portion 10 of the tool is provided with a shank portion 11, a handle portion 12 and a soldering portion 13 which terminates in a conical tip or applicator portion 14.

Referring now more particularly to the attachment wherein the invention consists, the frame 15 is provided with a side plate or standard portion 16 which extends lengthwise of the tool and radially from the axis thereof, and a base portion 17, said portion 17 being desirably a flange which extends laterally from the side plate 16. Near the junction of said flange 17 with said plate 16, said plate is provided with apertures 18 through which extend the clamping members 19. Said clamping members 19 each consist preferably of a split ring which is provided at each side of the split portion thereof with an apertured ear 20, clamping bolts or screws 21 being passed through said ears and having screwed on to them the nuts 22. The clamping rings 19 are preferably constructed to enclose the body of larger diameter than the body 10 of the soldering tool, thus providing room for interposing a layer 24 of asbestos or other heat-insulating material between each of said rings and the body of the soldering tool.

The upper portion of the sheet material, of which the plate 15 is preferably formed, is arched or bent over as shown in Fig. 3 to form means to adjustably support the guide 25 for the wire solder 26 which is fed from a reel 27, said reel being rotatably supported in any desired manner as, for example, by a pivot rod 27a which is mounted upon the main frame 15 of the attachment. Said guide 25 has a rotatably adjustable curved spout 28 mounted therein, the adjustment of said spout 28 being effected by means of a rod 30 which is so bent as to avoid interfering with other parts of the device, and which is provided with an operating handle 31 positioned for convenient adjustment by means of the finger or thumb of the hand whereby the operator grasps the handle portion 12 of the tool. Said spout 28 is of a proper size to permit a solder wire 26 to be conveniently fed therethrough and said spout is rotatably mounted so as to be adjustable by means of the rod 30 to and from a position for bringing the delivery portion thereof into close proximity with the tip portion 14 of the tool.

The preferred means to support the spout 28 in order to provide a rotational adjustment thereof is shown in detail in Figs. 1, 2 and 6. Referring more particularly to these views, the arched or bent over portion 25 of the frame side plate 16 is arranged to form a clamp to secure in place a bearing sleeve 26s within which is rotatively fitted the bearing or shank portion of the spout 28. Said bearing sleeve 26s is gripped in place by means of the clamping bolt 26b and clamping nut 26n with which the clamping member which has been described is provided. As shown in section in Fig. 2 the adjusting arm or rod 30 is provided with a downwardly directed end portion 30x which is flattened as shown and is welded or otherwise secured to the shank portion of the spout 28.

Between the guide 25 and the reel 27 combined guiding and feeding means are provided through which the solder wire 26 is led. These last mentioned means comprise a pair of cooperating dog-carrying elements, namely, a rear dog-carrying element 35 and a front dog-carrying element 45. Said element 35 is pivotally mounted upon and moves with a bell crank lever 36 which is pivotally supported at 37 and which is provided with a downwardly and rearwardly extending operating handle 38 positioned to be conveniently moved by a finger of the hand with which the operator holds the tool. Said element 35 is shown provided with a headed guide stud 39 which projects through a slot 40 provided in the frame plate 16. A spring 41 has one end connected with said element 35 and its other end connected with the side plate 16, said spring being thus positioned to retract or move rearwardly the element 35 after it has been moved forwardly by means of the handle 38. Said element 35 is also provided with a dog 42, the free end of which engages the lower side of the solder wire 26 in such a manner as to cause said wire to be fed toward the point of use whenever the handle 38 is operated. Said dog 42 is provided with a retracting spring 43 which may be attached to the pivot 44 whereon the dog is mounted.

The dog-carrying element 45 is stationary and is shown as consisting of an extension of the side plate 16 of the main frame of the attachment. Said element 45 is provided with a dog 46 the free end of which is positioned to prevent retrograde movement of the solder wire 26, said dog being held in its operative position by means of a small retracting spring 47 which is shown attached to the pivotal support 48 of the dog.

In order to cause the dogs 42 and 46 more efficiently to perform their function the dog 42 is shown provided at its free end with a notch 42n adapted to engage the solder wire 26 and the dog 46 is provided with a like notch 46n which performs a similar function.

The tool is shown provided with the usual electrical connection 50x and terminal plug 51x.

In Figs. 7 and 8 is shown a modified form of the invention wherein parts which remain the same as in the form first described, have similar reference characters applied to them.

In these views, however, the upright frame plate 47 is modified to adapt it to have pivotally attached thereto by means of a pivot screw 47a, a rocking plate or frame 48. Said plate 48 is provided with a dog-carrying portion 45 like that shown in Fig. 1, and also has a spout 28 secured thereto by means of a bent over portion 48b thereof, the clamping screw 48c being used to hold said spout 28 in place. At its inner or rear end said plate 48 is provided with an extension 48x to which is secured the upper end of a tension spring 48s, the lower end of said spring being secured to the plate 47. By this arrangement the spout 28 is normally yieldingly maintained with its delivery end in spaced relation to the applicator portion 14 of the tool as shown in Fig. 7.

The feed lever 50 is pivotally mounted between its ends upon a split ring 51 by means of a small pivot bolt or screw 52. Said split ring 51 is adapted to be clamped upon the shank 11 of the soldering tool. For this purpose said ring is provided with a pair of apertured ears 53 through which extends a clamping bolt 54 having a nut 55 screwed on to the end thereof.

One end of said feed lever 50 is twisted to form a finger hold 60 and the other end of said lever is pivotally connected with one end of a link 61, the other end of said link being adjustably secured to the feeding device 65 by means of a clamp or holding device 66 which is provided with a clamping screw or set screw 67 adapted to be screwed down upon the link 61 to secure it in the adjusted position.

Said feeding device 65 is of the nature of a housing which is adapted to enclose and guide the wire solder as it is fed from the reel 27. The only connection between the housing plate 65 and the rocking plate 48 is by means of a pivot stud 70 which extends across the space between the two sides of said housing plate 65 and then projects beyond said plate 65, as viewed in Fig. 7, the far end portion of said stud 70 extending through a slot 71 in the rocking plate 48 and then being provided with a head which keeps it from being withdrawn from said slot, this stud being formed and arranged like the stud 39 shown in Fig. 3.

To the lower portion of the housing plate 65 is connected one end of a spring 70x the other end of said spring being connected to the extension 48x of the plate 48. Said spring 70x normally maintains the housing plate 65 of the feeding device in the position shown in Fig. 7 with the pivot stud 70 thereof engaging the rear end of the slot 71, but the operator may operate the lever 50 against the opposition of said spring and may thereby, through the action of dog 68d feed the wire solder to and through the guide spout 28. When the finger hold 60 of the lever 50 is sufficiently retracted to bring the stud 70 against the forward end of slot 71, farther movement of said lever 50 will tilt the plate 48 upon its pivot 47a and will thereby bring the delivery portion of the spout 28 closer to the applicator portion 14 of the tool, thus bringing the end of the wire of solder against the part 14 of the tool and causing it to be fused and supplied for use when needed. Therefore it will be seen that if the lever 38 is given but a slight operative movement the effect will be to feed forward the wire solder without affecting the position of the spout 28, but if said lever is sufficiently moved it will rock the spout upon its transverse axis and bring the delivery end thereof closer to the applicator portion of the tool. Hence if said operating lever be held back by the finger a considerable extent and, while so held back, be repeatedly moved short distances the effect will be to move the delivery portion of the spout toward and from the applicator portion of the tool without advancing the wire solder; but if said lever be repeatedly moved short distances from its initial or retracted position the effect will be to advance the wire solder without disturbing the position of the spout.

The operation of both forms of the device has been frequently referred to in the foregoing description and will therefore be readily understood without further explanation thereof.

I claim:

1. In a device of the kind described, an elongated soldering tool having an applicator portion, a support extending laterally from said tool, a spout having a shank portion which is mounted upon said support and which is turnable about an axis which extends substantially parallel to the long axis of the tool, a manually operable rod or arm secured to said spout to turn the same upon said support to vary the distance of the delivery portion of the spout from the applicator portion of the tool, and means to feed wire solder through said spout.

2. In a device of the kind described, an elongated tool having an applicator portion, a support extending laterally from said tool in fixed relation thereto, a spout having a shank portion which is mounted upon said support and which is turnable about an axis which extends substantially parallel of the long axis of the tool, a manually operable rod or arm secured to said spout to turn the same upon said support to vary the distance of the delivery portion of the spout from the applicator portion of the tool, said spout being also rockable upon its said fixed support to provide an additional means for varying the distance of the delivery portion of the spout from the applicator portion of the tool, and means to feed wire solder through said spout step by step to the applicator portion of the tool, said last recited means causing a rocking movement of the spout upon its said fixed support and toward and from the applicator portion of the tool.

3. In a device of the kind described, an elongated tool having an applicator portion, a support extending laterally from said tool in fixed relation thereto, a spout having a shank portion which is rockable thereon to vary the distance of the delivery portion of said spout from the applicator portion of the tool, while maintaining substantially the same position for the spout as a whole with relation to the length of the tool, and means manually operable by a single lever to rock said spout and at the same time feed the wire solder an advance step therethrough.

4. In a device of the kind described, an elongated tool having an applicator portion, a support extending laterally from said tool in fixed relation thereto, a spout having a shank portion which is circumferentially rockable on said support to vary the distance of the delivery portion of said spout from the applicator portion of the tool, while maintaining substantially the same position for the spout as a whole with relation to the length of the tool, and means manually operable by a single lever to rock said spout upon its transverse axis and also feed the wire solder to the applicator portion of the tool, the effect of the initial portion of the operative movement of said lever being to advance the solder through said spout without rocking the spout, and the effect of the final portion of the operative movement of said lever being to rock said spout upon its transverse axis to bring the delivery portion thereof closer to the applicator portion of the tool.

In testimony whereof I hereunto affix my signature.

WALTER H. RIGHTER.